(12) United States Patent
Le Guelvouit et al.

(10) Patent No.: US 11,134,080 B2
(45) Date of Patent: Sep. 28, 2021

(54) METHOD FOR AUTHENTICATING A TERMINAL EQUIPMENT, DEVICE, SERVER EQUIPMENT AND RELATED COMPUTER PROGRAM

(71) Applicant: FONDATION B-COM, Cesson Sevigne (FR)

(72) Inventors: Gaetan Le Guelvouit, Thorigne-Fouillard (FR); Alexandre Garel, La Chapelle-sur-Erdre (FR)

(73) Assignee: FONDATION B-COM, Cesson Sevigne (FR)

( * ) Notice: Subject to any disclaimer, the term of this patent is extended or adjusted under 35 U.S.C. 154(b) by 79 days.

(21) Appl. No.: 16/466,485

(22) PCT Filed: Oct. 19, 2017

(86) PCT No.: PCT/FR2017/052875
§ 371 (c)(1),
(2) Date: Jun. 4, 2019

(87) PCT Pub. No.: WO2018/104599
PCT Pub. Date: Jun. 14, 2018

(65) Prior Publication Data
US 2019/0319952 A1   Oct. 17, 2019

(30) Foreign Application Priority Data
Dec. 5, 2016   (FR) ........................................ 1661903

(51) Int. Cl.
*H04L 29/06* (2006.01)
*G06F 21/31* (2013.01)
*G06F 21/44* (2013.01)

(52) U.S. Cl.
CPC .......... *H04L 63/0876* (2013.01); *G06F 21/31* (2013.01); *G06F 21/44* (2013.01); *H04L 63/083* (2013.01)

(58) Field of Classification Search
CPC ........ G06F 21/36; H04L 63/083; H04L 63/08
See application file for complete search history.

(56) References Cited

U.S. PATENT DOCUMENTS

| 2009/0041380 A1* | 2/2009 | Watanabe ............... G06F 21/84 382/276 |
| 2014/0059672 A1* | 2/2014 | Natividad ............... G06F 21/36 726/18 |

(Continued)

FOREIGN PATENT DOCUMENTS

GB   2485241 A   5/2012

OTHER PUBLICATIONS

French Search Report and Written Opinion dated May 31, 2017 for corresponding French Application No. 1661903, filed Dec. 5, 2016.
(Continued)

*Primary Examiner* — Jason K Gee
(74) *Attorney, Agent, or Firm* — David D. Brush; Westman, Champlin & Koehler, P.A.

(57) ABSTRACT

A method for authenticating a user of a terminal equipment connected to a communication network, for access from this terminal equipment to a remote service hosted by a server equipment connected to the network. The method includes the following steps, implemented by the server: authenticating the user from credentials; in the event of successful user authentication, authenticating the client equipment from credentials stored in a first memory of the server in association with the user's credentials, including a command to render a first pattern, the command including parameters describing the first pattern and rendering the first pattern received from the client equipment, so-called reference (Continued)

Figure 1A:
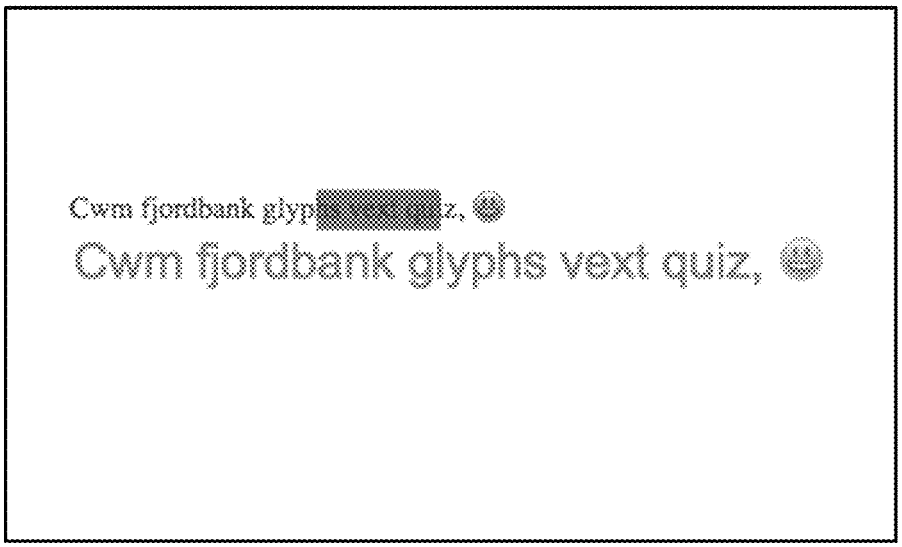

pattern; deciding on authenticating the client equipment according to the evaluated score, a successful authentication being decided when the match score is greater than a predetermined threshold; and following the authentication decision, updating the credentials of the terminal equipment.

8 Claims, 6 Drawing Sheets

(56) References Cited

U.S. PATENT DOCUMENTS

| | | | |
|---|---|---|---|
| 2015/0121489 A1* | 4/2015 | Yang | G06F 21/46 726/6 |
| 2016/0155128 A1 | 6/2016 | Desai et al. | |
| 2018/0013755 A1* | 1/2018 | Hassan | G06F 3/0484 |

OTHER PUBLICATIONS

International Search report dated Dec. 20, 2017 for corresponding International Application No. PCT/FR2017/052875, filed Oct. 19, 2017.
English translation of the Written Opinion of the International Searching Authority dated Jan. 5, 2018 for corresponding International Application No. PCT/FR2017/052875, filed Oct. 19, 2017.
Furkan Alaca et al., "Device fingerprinting for augmenting web authentication: classification and analysis of methods", Draft Submitted at ACSAC 2016, Nov. 9, 2016 (Nov. 9, 2016), XP055377372.
Elie Bursztein et al., "Picasso: Lightweight device Class Fingerprinting for Web Clients", Security and Privacy in Smarthones and Mobile Devices, ACM, 2 Penn Plaza, Suite 701 New York NY 10121-0701 USA, Oct. 24, 2016 (Oct. 24, 2016), pp. 93-102, XP058300274.
K. Mowery et al., "Pixel Perfect: Fingerprinting Canvas in HTML 5", Proceedings of the Workshop on Web 2.0 Security and Privacy (W2SP), May 24, 2012.

* cited by examiner

| ID-UT1 | MDP1 | @1 | ST1 | ～ TU |
|---|---|---|---|---|
| ID-UT2 | MDP2 | @2 | ST2 | |

FIG. 5A

| ID-ES1 | ES1 | ～ TES |
|---|---|---|
| ID-ES2 | ES2 | |

FIG. 5B

| ID-CRP$1_1$ | R$1_1$ | SC$1_1$ | STED$1_1$ | ～ TED |
|---|---|---|---|---|
| ID-CRP$2_1$ | R$2_1$ | SC$2_1$ | STED$2_1$ | |
| ID-CRP$3_1$ | R$3_1$ | SC$3_1$ | STED$3_1$ | |

FIG. 5C

| ID-CRP$1_2$ | R$1_2$ | SC$1_2$ | STED$1_2$ | ～ TED' |
|---|---|---|---|---|
| ID-CRP$1_3$ | R$1_3$ | SC$1_3$ | STED$1_2$ | |
| ... | ... | ... | ... | |
| ID-CRP$2_2$ | R$2_2$ | SC$2_2$ | STED$2_2$ | |
| ID-CRP$2_3$ | R$2_3$ | SC$2_3$ | STED$2_3$ | |

FIG. 5D

| | ID-UT1 | ID-ES1 | ID-CRP$1_1$ | ID-CRP$1_2$ | ... | ～ TA |
|---|---|---|---|---|---|---|
| Ln1 | | | | | | |
| Ln2 | ID-UT1 | ID-ES2 | ID-CRP$2_1$ | ID-CRP$2_2$ | ... | |

FIG. 5E

METHOD FOR AUTHENTICATING A TERMINAL EQUIPMENT, DEVICE, SERVER EQUIPMENT AND RELATED COMPUTER PROGRAM

1. CROSS REFERENCE TO RELATED APPLICATIONS

This Application is a Section 371 National Stage Application of International Application No. PCT/FR2017/052875, filed Oct. 19, 2017, the content of which is incorporated herein by reference in its entirety, and published as WO 2018/104599 on Jun. 14, 2018, not in English.

2. FIELD OF INVENTION

The field of the invention is that of access control to a remote service hosted by a server equipment of a telecommunications network.

The invention may especially, but not exclusively, apply to the authentication of a terminal equipment of a user who wishes to access such a service.

3. DESCRIPTION OF THE RELATED ART

The document by K. Mowery et al, entitled "Pixel Perfect: Footprinting Canvas in HTML 5", published in "Proceedings of the Workshop on Web 2.0 Security and Privacy (W2SP)" on May 24, 2012, discloses a system for generating footprints of a web browser of a terminal equipment, based on the result of execution of pattern rendering commands by this browser. Such a command is programmable and specifies the characteristics of a pattern that can be graphic or audiovisual, whose rendering uniquely characterises the browser that has executed it. The pattern in question is for example reproduced inside a drawing surface. Advantageously, a "script" component of the HTML markup language can be used for translating this command in the form of a program or script. The execution of this script by the browser causes it to produce an image including the rendering of the pattern. The resulting image can be inserted in a tag of "canvas" type of the HTML markup language. The document evokes the possibility for a remote banking service to exploit the footprint constituted by the rendering of pattern produced by the web browser of the client equipment to reinforce its access control, by triggering an additional authentication when the rendering of pattern produced by the browser does not match the one previously stored in memory.

An advantage of this method is to increase the resistance to illegitimate authentication attempts. Indeed, it creates a type of additional authentication data that a hacker must recover before he can impersonate the user.

4. DISADVANTAGES OF THE PRIOR ART

A disadvantage of this method is that it is no longer effective once a hacker has successfully intercepted the pattern rendering command and rendering pattern produced by the client browser.

5. SUMMARY OF THE INVENTION

An aspect of the present disclosure relates to a method for authenticating a user of a terminal equipment connected to a communication network, for access from this terminal equipment to a remote service hosted by a server equipment connected to said network, said method comprising the following steps, intended to be implemented by the server equipment:
  authentication of the user from credentials;
  in the event of successful user authentication, authenticating the client equipment from credentials stored in a first memory of the server equipment in association with the user's credentials, including a command to render a first pattern whose values are randomly selected from a plurality of predetermined values, said command comprising parameters describing the first pattern, and rendering the first pattern received from the client equipment, said reference pattern, said authentication comprising the following substeps:
    sending to the client equipment the first pattern rendering command;
    upon receipt of a response comprising a rendering of the first pattern by the client equipment, comparison with the reference rendering and evaluation of a match score;
  decision of authenticating the client equipment according to the evaluated score, a successful authentication being decided when the match score is greater than a predetermined threshold;
According to the invention, following the authentication decision, the method comprises a step of updating the credentials of the terminal equipment, said step comprising, following a failed authentication, deleting the command of rendering of the first pattern and the rendering of the first pattern of the first memory and, in the event of successful authentication of the client equipment, replacing the rendering command of the first pattern and the reference rendering stored in the first memory, with a rendering execution command of a second pattern, distinct from the first and whose parameter values are randomly selected from a plurality of predetermined values, and a second pattern rendering.

The invention exploits, for the authentication of the client equipment of the user, pattern rendering parametrisable commands, the result of which is able to uniquely identify the client equipment that it has itself generated.

The principle of the invention consists in modifying the authentication data of the client browser, namely the rendering command of the reference pattern and the rendering of the reference pattern produced by the client, since they have been exploited for an authentication request.

This way, if an hacker managed to intercept a response including the first rendering of the pattern produced by the client device, he cannot use it to impersonate the user, because this first rendering is not reused in future authentications, whether the authentication was successful or not. The level of security is therefore increased.

Unlike footprints commonly used to authenticate a user equipment, which is built from hardware and software configuration elements, which are by nature relatively fixed, the rendering commands in a client of the terminal equipment offer virtually unlimited rendering possibilities, which are particularly well suited to the dynamic operation proposed by the invention.

The invention thus relies on a completely new and inventive approach of authentication which consists of taking advantage of this possibility of dynamic production of new authentication data by the client, to reserve them for a single use.

With the invention, a successful authentication of the client equipment by pattern execution systematically triggers a replacement of the pair of authentication data, reference pattern rendering execution command and reference pattern rendering by the client, stored in memory, with a new pair.

Since the execution of this pattern command is carried out by the client of the user equipment in a manner that is transparent to the user, it goes without saying that this systematic updating of the authentication data of the terminal equipment is not binding on said user.

With the invention, following a failed authentication, the update of the credentials of the client includes a deletion of the first pattern rendering command and the first pattern rendering of the first memory.

Whether the user's account has been hacked into or the user attempted to connect with new terminal equipment, the authentication data was used during the last connection attempt. They are therefore deleted. After this operation, the user no longer has valid authentication data for the client device registered.

According to the invention, a pattern rendering execution command is generated from a random selection of the values of the pattern description parameters from a plurality of predetermined values.

It turns out that a pattern can be specified by more than 40 different parameters. Each parameter can take on average several hundred different values. There is therefore an infinity of possibilities ($1.e^{80}$ for an average of 100 values per parameter). It is therefore guaranteed that the client will not be asked for the same pattern rendering.

According to another aspect of the invention, in the case of successful authentication, the updating step comprises a sub-step of obtaining the second pattern rendering by the client by reading in a second memory of the server equipment the execution command of the second rendering.

The rendering command for the second pattern has been previously issued, for example during the registration or first authentication of the user and his client to the remote service. In this case, the server simultaneously issued several distinct pattern-rendering commands to the user's client and stored the results for later use. He thus took advantage of the certainty of the first connection of the client to pre-constitute a stock of authentication data allowing him to perform several successive authentications of this client.

Advantageously, the pair of second authentication data is deleted from the second memory so that it cannot be reused for subsequent authentication.

According to yet another aspect of the invention, the updating step comprises following the successful authentication, a sub-step of obtaining the second rendering by the client by transmission, of the rendering command of the second pattern, and receiving a response comprising a rendering of the second pattern by the client.

The successful authentication triggers the obtaining of new authentication data for a next connection request from the client. A first benefit is to get the data as needed and thus save server-side storage resources. A second advantage is that this production of new authentication data is performed in the event of successful authentication of the user pair and therefore under satisfactory security conditions.

Advantageously, the issuance of the rendering command of the second pattern is triggered when the second memory does not include rendering of a second pattern, distinct from the first.

One advantage is that the server only commands the execution of a new pattern when it has exhausted its reserves.

According to one aspect of the invention, the command to execute a first or second pattern rendering is a command belonging to a group comprising at least:
  a "canvas" type command for producing a graphic pattern in a rectangular frame of a predetermined size;
  an audio context type command comprising parameters for describing an audio signal and for generating an audio rendering,
  a "getClientRects" type command, for generating a plurality of rectangles corresponding to the text line boundaries of an HTML element.

The canvas command defines a JavaScript-controllable drawing surface in HTML format. The rendering of the canvas can be of two types, namely "2d" context or "WebGL" context. It depends on many configuration parameters of the terminal equipment, such as installed fonts, operating systems, type of anti-aliasing, graphics card etc. It is very discriminating from one terminal to another.

Audio context type commands define one or more audio signals to be reproduced by a user's equipment. These audio signals are controllable in JavaScript (amplitude, frequency, type, . . . ) and can undergo several transformations through different audio modules such as filters (BiquadFilterNode), compressors (DynamicsCompressorNode), frequency analysis modules (AnalyzerNode) or others. Audio rendering depends on many configuration parameters of the terminal equipment, such as the operating system, the internet browser, the sound card (or motherboard), and so on. The rendering is very discriminating from one terminal to another.

"GetClientRects" type commands capture the limits of an HTML element, for example an element of "span" type and turn them into rectangles collections. These commands can be managed in Javascript in the sense that the client can define the content of the HTML element to size. The dimensions of these rectangles depend on many configuration parameters of the terminal equipment, such as the operating system, the web browser, the graphics card, etc. The dimensions obtained are very discriminating from one terminal to another.

According to yet another aspect of the invention, based on failed authentication, the method comprises a step of issuing an additional authentication request for the identified client equipment, and, in case of a positive result, creating new authentication data associated with a second client equipment, comprising a step of issuing a execution command of rendering of a third pattern and a third pattern rendering by the second client device and a step of storing authentication data, associating with an identifier of the second client equipment, said third pattern rendering command and said rendering.

This is the case where the user has confirmed that he indeed was the one who had tried to log in. This means that it has used a second client device, which is not yet known to the server equipment and should be registered.

Advantageously, following a successful additional authentication, the method further comprises an updating step of the authentication data from the first client device comprising a substep of obtaining a rendering control of a second pattern and a second pattern rendering by the first client device by reading in a second memory of the server equipment.

As the authentication data of the first terminal equipment have been removed, they should be replaced.

According to another aspect of the invention, the method comprises a prior phase of registering the user and the first client device, comprising a step of transmitting at least an execution command of a first pattern and upon receiving a first pattern rendering by the client equipment, a step of storing the command and of rendering as authentication data of the client equipment in the first memory in association with an identifier of the user and an identifier of the first client equipment.

According to yet another aspect of the invention, the step of issuing the command to execute a first pattern is repeated at least once and the registration phase comprises a step of comparing the first pattern renderings obtained, wherein the storage step is triggered when the renderings are identical.

One advantage is to store only stable and reproducible renderings over time, which guarantees reliable authentication and avoids false alarms.

According to yet another aspect of the invention, the transmission step comprises at least one command for executing a second pattern and said command and the rendering of the second pattern obtained are stored in a second memory.

Several commands are issued simultaneously. One advantage is to constitute a pool of authentication data of the first client equipment, so as to easily perform the update according to the invention.

According to another aspect of the invention, before the issuance of the first pattern rendering command to the first client equipment, the method comprises a step of verifying a state associated with said command, the transmission of the command is triggered only for a state set to a "usable" value and, following the issuing of said command, the method comprises a step of changing said state, the "usable" value being replaced by a "used" value.

An advantage is that in the event of an unsuccessful authentication attempt by a malicious user, who is stopped before the decision is made and therefore the update of the authentication data, the pair of authentication data is marked as already used and will not be reissued. During a subsequent authentication, the server equipment may resort, if necessary, to a pair of reserve authentication data or ask the user for an additional authentication parameter and, if successful, issue a new pattern rendering command to the client equipment.

The various embodiments or features mentioned below may be added independently or in combination with each other, to the characteristics of the authentication method defined above.

The invention also relates to a authentication device adapted to implement the authentication method according to any one of the particular embodiments defined above. Said device may of course include the various characteristics relating to the authentication method according to the invention. Thus, the characteristics and advantages of said device are the same as those of the method, and shall not be detailed further.

Correlatively, the invention also relates to a server equipment comprising a data transmission /reception module to and from a telecommunications network, a processing module able to execute a remote service and an authentication device of a terminal equipment of a user wishing to access the service according to the invention.

The invention also relates to a computer program comprising instructions for implementing the steps of a method as described above, when this program is executed by a processor.

Such a program can use any programming language. It can be downloaded from a communication network and/or recorded on a computer-readable medium.

The invention finally relates to a registration medium, readable by a processor, integrated or not to the authentication device according to the invention, possibly removable, respectively storing a computer program implementing an authentication method, as previously described.

6. LIST OF FIGURES

Figure 1B:
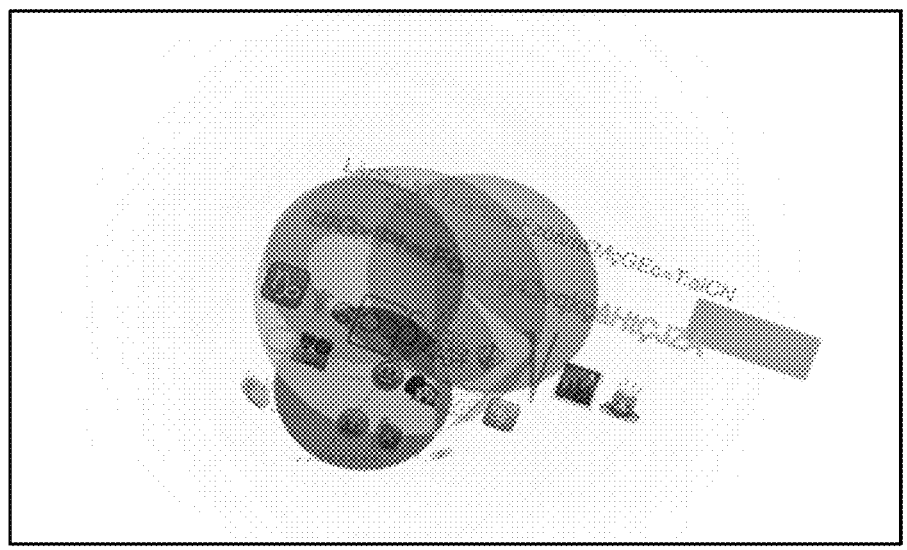
Figure 2:
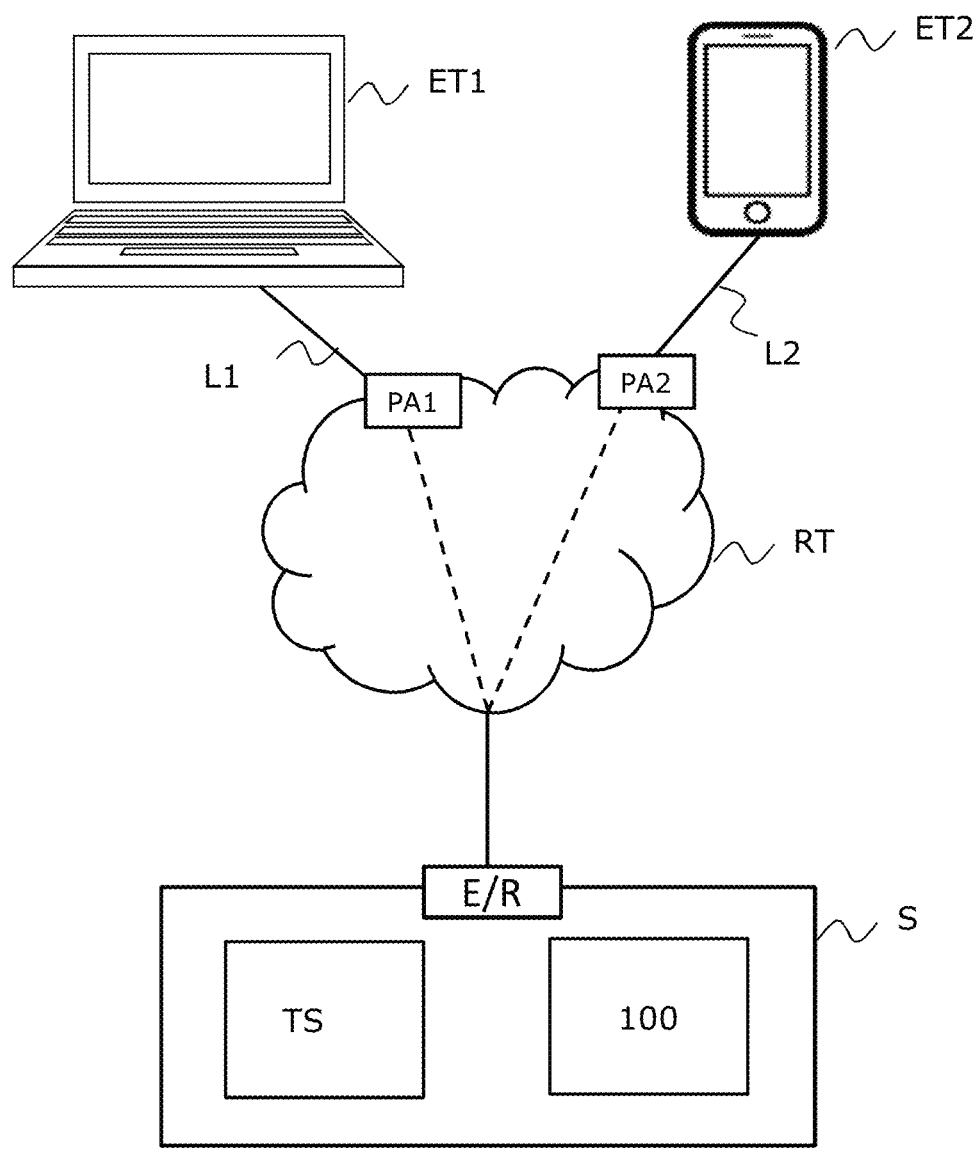
Figure 4:
Figure 3:
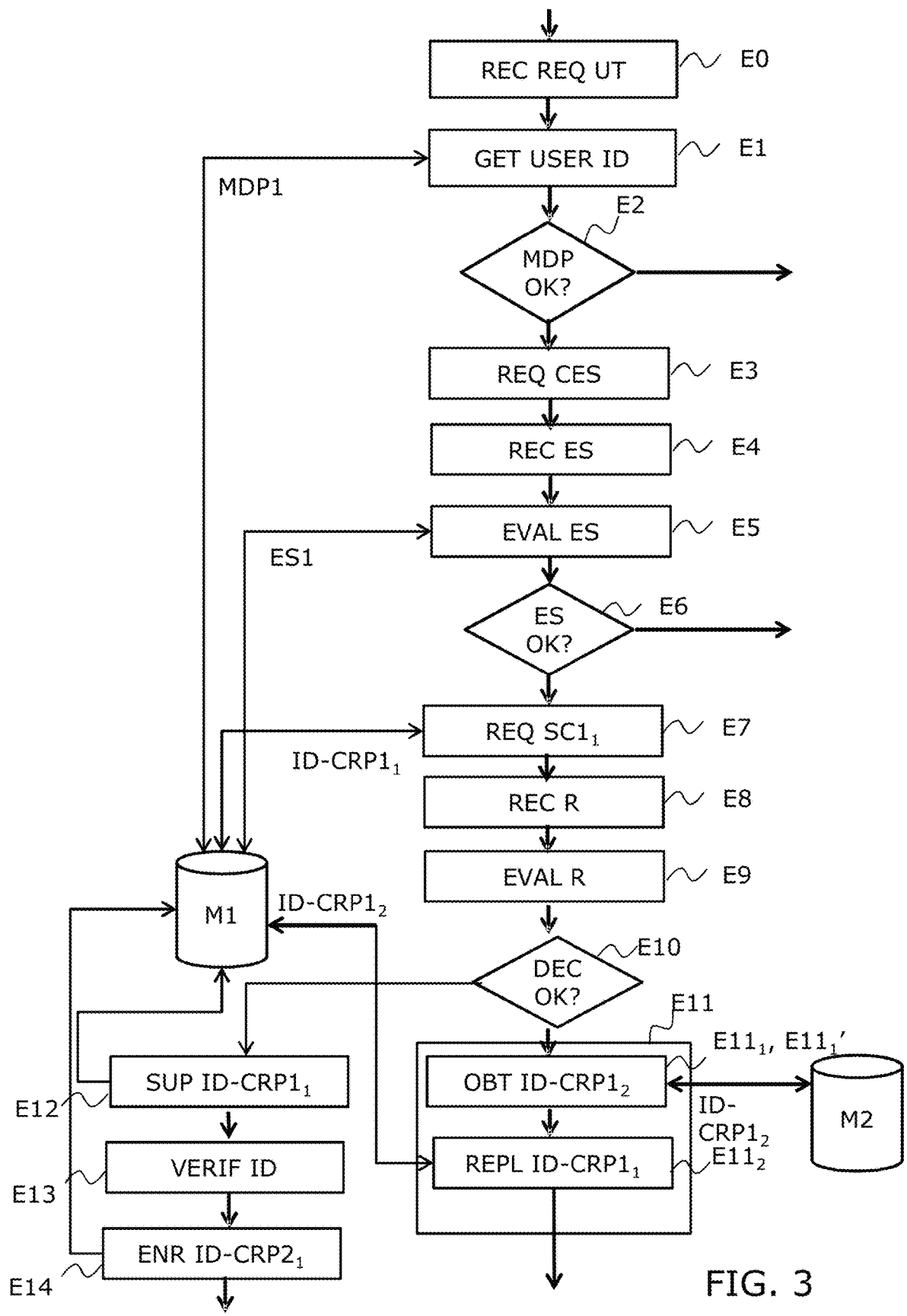
Figure 6:
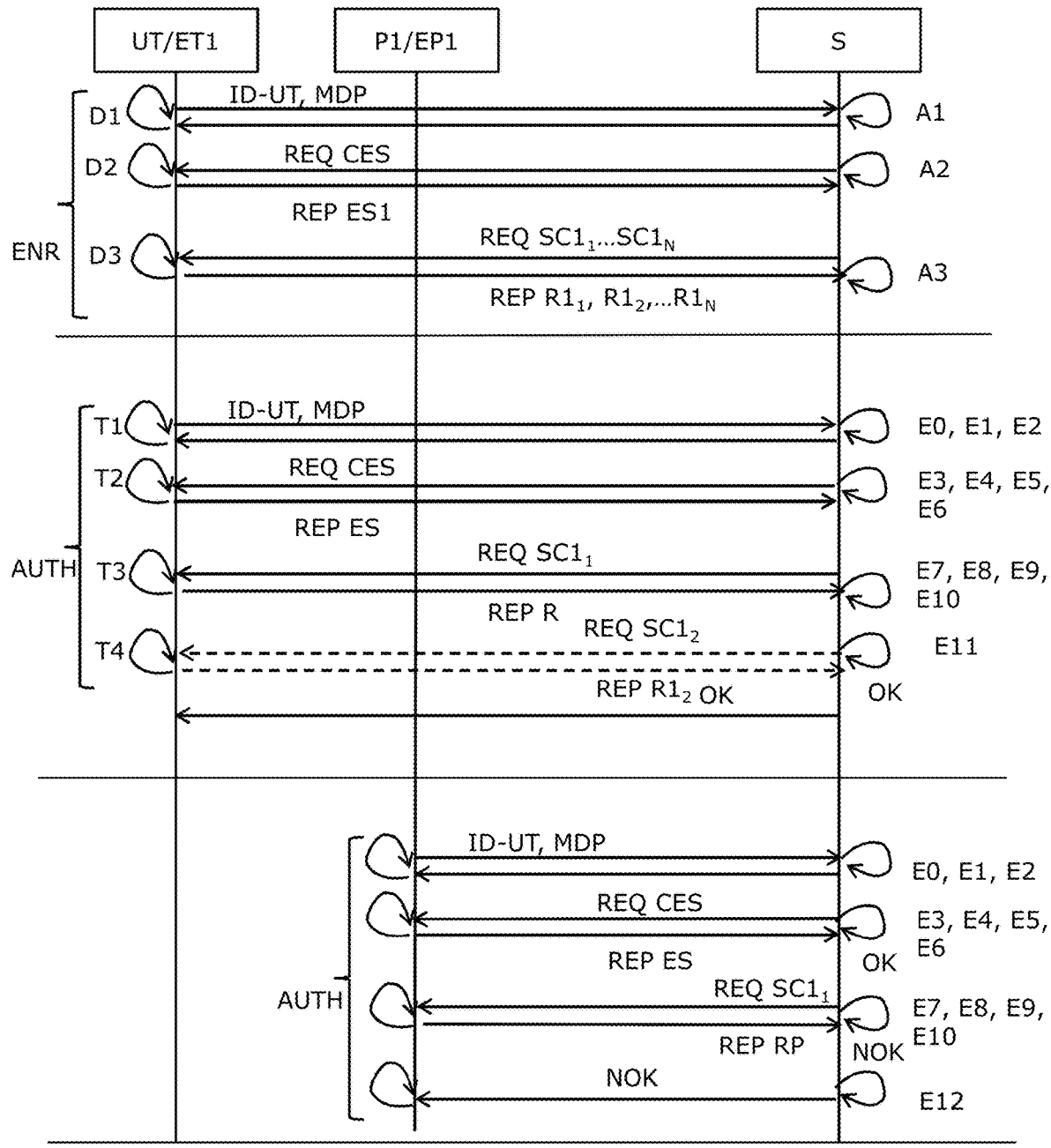
Figure 7:
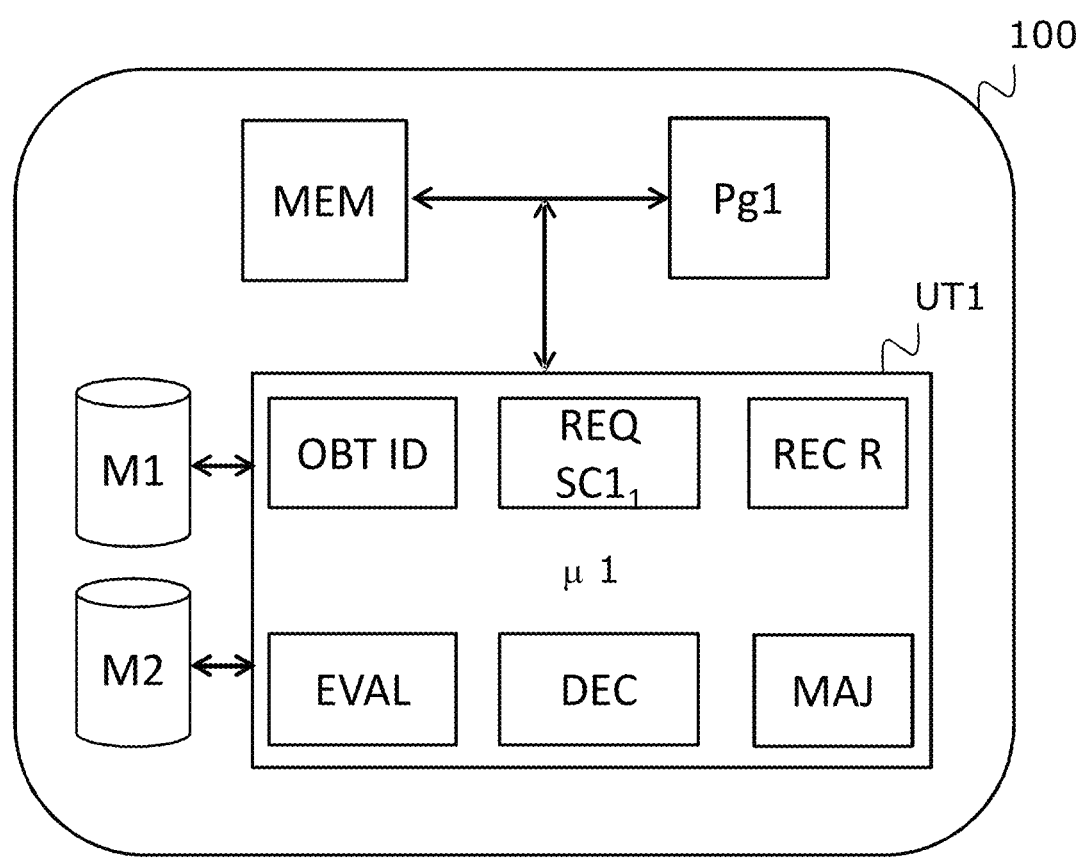

Other features and advantages of the invention will appear more clearly on reading the following description of an embodiment of the invention, given as a simple illustrative and non-limiting example, and the appended drawings among which:

FIGS. 1 A and 1B (already described) show examples of patterns of "canvas" type;

FIG. 2 shows schematically a first and a second terminal equipment of a user who wishes to log in to a remote service hosted by a server equipment;

FIG. 3 schematically shows the steps of a method for authenticating a user of a terminal equipment by a server equipment according to one embodiment of the invention;

FIG. 4 schematically shows an example of a home page for access to the service hosted by the server;

FIGS. 5 A to 5E show examples of the user authentication data registration tables and at least one terminal equipment of the user by the server equipment to the access control to the remote service, according to one embodiment of the invention;

FIG. 6 schematically shows a flow diagram of the messages exchanged between the server equipment and the terminal equipment of a user; and FIG. 7 schematically shows the hardware structure of a user authentication device according to one embodiment of the invention.

7. DESCRIPTION OF A PARTICULAR EMBODIMENT OF THE INVENTION

The general principle of the invention is based on the use of the result of the execution of a parameterisable pattern rendering command as an authentication data of a terminal equipment of a user and on the updating of said data after each new authentication attempt.

In relation with FIG. 2, a user UT of a first terminal equipment ET1 is considered, for example a mobile terminal of "smartphone" type or a tablet or a personal computer, who wishes to access a remote service Sv hosted by a server equipment S connected to an communications network R. The first terminal equipment ET1 is able to connect to an access point PA1 of a network communication R, via a wired link L1 or a short-range radio link, for example using a Wi-Fi technology or via a radio access link to an access point such as a 3G, 4G type base station ("node-B" for 3G, "e-node B" for 4G) or a future generation of the 3GPP standard.

It is assumed that the user has a second terminal equipment ET2 from which he accesses an access point PA2 of the network R via a link L2 and may request access to the same service.

For example, let us consider a conventional situation of a first mobile terminal equipment that allows the user to log in to the service when travelling and a second fixed terminal equipment that he uses from his home or office.

The service in question may be for example a management service of a bank account or any other professional or private service, provided that the user's connection to his account is subject to access control.

In the following, it is considered that the user accesses the service in question via a web browser, within which he accesses a service access control web page. Of course, the invention is not limited to this example. The service can also be accessible by launching an application software, for example of the mobile application type, which can establish a connection to the remote service Sv.

For example, the client equipment communicates with the server equipment via a communication protocol such as the hypertext transfer protocol, commonly used for the public hypertext system operating on Internet (for "World Wide Web") and enabling to look up, with a browser, pages accessible on web sites. HTTP is a protocol of the application layer of the OSI stack. It can work on any reliable connection, in fact we use the TCP protocol as a transport layer. It can work on any reliable connection, in fact we use the port 80 link (443 for HTTPS). Of course the invention is not limited to this protocol and could use other communication protocols.

The server equipment S according to the invention comprises a connection module E/R to the network R, through which it can communicate with one of the terminal equipment of the user, an authentication device 100 which will be described in more detail below in connection with FIG. 5 and at least one memory M. It also comprises a processing module TS, able to render the remote service.

In relation with FIG. 3, the steps of a method of authentication of this user by the server equipment S which hosts the service Sv are now described.

During a step E0, the server equipment S receives a connection request to the service Sv from the first terminal equipment ET1 of the user UT. Typically, it takes the form of a GET type http request specifying the address or URL (for "Uniform Resource Locator") from the remote service website.

In E1, it obtains at least one identifier ID-UT of the UT user. This is for example an email address or user name or a sequence of alphanumeric characters chosen by the user or by the server equipment and associated with the user UT. In connection with FIG. 4, there is shown an example home page on which the user is asked to enter his identifier and the password associated with it.

It is assumed that the user UT has previously registered himself for the service. In a known manner, this registration is generally made during a first service connection request. The application server equipment requests the user to select an ID-UT ID and a related MDP password. Advantageously, the method performs an authentication of the user, according to a technique known per se, from this identifier based on the provision of a password and the comparison of this password provided with a reference password, MDP1, stored in memory, for example in a user table TU of a memory M1. In connection with FIG. 5A, such a table comprises advantageously, for this user UT a line or a registration comprising these credentials of the user. It can also comprises additional data, such as for example a user's email address ©1, when the identifier is of another type, or a ST state of the account of the user, intended to take at least one value blocked after a failed authentication attempt or, if not, an "unblocked" value.

In E2, the server equipment decides on the result of the authentication. If the password produced by the user corresponds to the reference password stored in memory, the authentication has succeeded and the system proceeds to step E3. Otherwise, the authentication has failed and the request to access the service is rejected.

In E3, the server equipment implements an identification of the terminal equipment ET1. It is based on the sending by the server equipment of a REQ CES footprint command comprising a plurality of configuration parameters. For example, these parameters are related to a type and/or a version of the browser or application using (E) to access the service, one or more screen sizes of the first terminal equipment, to configurations selected by the user such as the browser language, the language of the operating system or a list of plug-ins installed on the browser.

The result of this command is a footprint ES1 which is said "static" because it consists of configuration data CONF1, CONF2, ..., CONFK of the web browser or of the application used by the terminal equipment, corresponding to the configuration parameters specified in the CES command. These data are a priori stable over time. They are also directly readable or easy to reproduce. For example, the user agent footprint is well-known, which is a string of characters that usually describes the model and version of the client application or of the web browser.

Such a static footprint command can be written in JavaScript. For example, this may be a CES script comprising "navigator.language" or still "screen.width" type instructions to specify configuration settings. The obtained script is inserted into a HTML page sent to the client equipment. Ideally, running this script involves sending the result to the server Sv via an http request, for example of GET or POST type.

Advantageously, the server equipment S completes the static footprint ES1 resulting from the CES script using additional configuration data that are systematically transmitted by the client equipment in the headers of the http requests, such as the user agent or the accepted language, via a program that can for example be written in Java.

It will be noted that, as the CES command is generally the same regardless of the terminal equipment, it can be easily captured by a malicious user or a hacker, who is also capable to reproduce the footprint stored by the server for the terminal equipment of the user whose identity the hacker is trying to impersonate.

For example, the hacker changes the values of the configuration parameters of his own browser so that the result of the footprint command CES corresponds to the footprint ES1 produced by the terminal equipment of the user UT. Alternatively, it intercepts the response comprising the footprint generated by its browser in response to the footprint command CES and modifies the values thereof so as to make this footprint identical to that of the terminal equipment of the user UT.

During a first connection, advantageously when registering the user for the service, the resulting footprint ES1 generated by the terminal equipment ET1 of the command CES has been stored in memory, in association with an ID-ES1 identifier of this command footprint, for example in a table TES of static footprints of the memory Ml, as illustrated in FIG. 5B.

Of course, a user can link multiple terminal devices to the same account. In this case the table TES will include as many rows or registrations as static footprints referenced for this user.

The static footprint ES1 constitutes an identifier of the terminal equipment ET1. Advantageously, it is associated with the identifier of the user UT in a line LUT of a table TA, called association table, stored in the memory M1 of the server equipment S. An example of a table is illustrated by the FIG. 5E.

If the user ID-UT has previously registered several pieces of terminal equipment ET1, ET2, the TA table comprises as many lines Ln1, Ln2 as identifiers of static footprint ID-ES1, ID-ES2 associated with the ID-UT user.

Upon receipt in E4 of a footprint ES produced by the terminal equipment ET1, an evaluation of this footprint is performed in E5 by comparison with the reference footprints stored in memory for this user. A match score is calculated for each reference footprint and then compared to a predetermined threshold. For example, the values of each of the configuration data CONF1, CONF2, . . . , CONFK are compared to that of a reference footprint so as to estimate a local score by data type and a global score is derived as a weighted sum of local scores for example using a weighted Hamming distance. Only scores above the threshold are retained. If only one score remains, it is decided in E6 that the terminal equipment ET1, ET2 associated with the corresponding footprint identifier ID-ES1, ID-ES2 has been identified. If several scores have exceeded the threshold, the highest is chosen. The system then goes to step E7.

Otherwise, if no score exceeds the threshold, identification of the terminal equipment is considered as failed and the request for access to the service is rejected.

Advantageously, in case of non-identification, the account can be blocked. To do this, the value of the field ST of the row of the table TU corresponding to the user ID-UT is changed and set to the "blocked" value. A message, for example of the mail type (or any other third party communication system) is then sent to the user at the registered address ©1. For example, this message includes an account unblocking code. Two situations are then possible:

1) The authentication attempt was legitimate, but the user tried to log in from a new terminal equipment. He can then unblock his account and associate the new terminal by inputting the code he received by mail from the new terminal;

2) The attempt was fraudulent, the user is then strongly encouraged to change the password. He can unblock his account using the code sent with the email from a terminal of his choice.

The preceding steps made it possible to identify the terminal equipment ET1 associated with the user ID-UT by its static footprint ES1. In result in E7, a dynamic authentication step is implemented.

During this step, at least one parametric pattern rendering command, which is also referred to as "challenge", is obtained. At a pre-registration phase, for example while inputting a login and a password by the user, said command was transmitted to the terminal equipment ET1 of the user UT, for example in the form of an executable program or script $SC1_1$. A result of execution of this command, namely the pattern rendering $R1_1$, was produced by the terminal equipment and then received by the server equipment S which stored it in memory, as a reference, in association with the identifier $ID\text{-}CRP1_1$ of the command and the corresponding script $SC1_1$.

Such a command specifies parameters for describing a pattern to be executed. This pattern can be audiovisual or graphic. In a particular embodiment, it is a rendering command of "canvas" type mentioned above. In this case, the parameters define geometrical characteristics of the pattern, or its font, its colours, or even the frame in which it must be displayed by the web browser or the application of the terminal equipment.

According to one embodiment of the invention, the script $SC1_1$ of the command is written in a JavaScript-type language. This script is created from description parameters of the pattern for using a script generation program using a programming language such as Python type. On the server side, a PHP function runs this program to obtain the script in JavaScript.

For example, the script is inserted using a PHP function of echo type in a web page sent to the client following the authentication of the user or following the authentication of the static footprint.

The terminal equipment executes the script $SC1_1$ using its browser or its client application and sends the result to the server via a HTTP request of GET or POST type. The result R of the request is picked up by the server.

This command $SC1_1$ and its associated reference result $R1_1$ constitute a pair of dynamic authentication data of the terminal equipment ET1 identified by $ID\text{-}CRP1_1$. The dynamic character comes from the fact that as such a command is parameterisable, potentially by a large number of factors, said command can be renewed almost infinitely.

Advantageously, this pair $ID\text{-}CRP1_1$ of dynamic authentication data is stored in a row of a table TED as illustrated by FIG. 5C. For example, a line comprises the identifier $ID\text{-}CRP1_1$ of the pair, the script $SC1_1$ of the corresponding command and the result of the execution of this command $R1_1$ generated by the terminal equipment ET1 when registering said equipment which constitutes the rendering of the reference pattern.

According to one embodiment of the invention, during registration, several first distinct commands $SC1_1$, $SC1_2$ . . . , $SC1_N$, with N being an integer greater than or equal to two, have been transmitted to the terminal equipment ET1 of the user ID-UT and the corresponding results have been received, which made it possible to constitute a pool of pairs $ID\text{-}CRP1_1$, $ID\text{-}CRP1_2$, $ID\text{-}CRP1_N$ of dynamic authentication data that can be exploited during future requests for authentications.

For example, these additional data pairs $SC1_2\text{-}R1_2$, $SC1_3\text{-}R1_3$ . . . $SC1_N\text{-}R1_N$ are stored in a reserve table TED'. For example, this table is stored in the first memory M1 or in a second memory M2.

According to another embodiment, during registration, the same rendering command $SC1_1$ is transmitted several times to the user terminal equipment ET1 and the results R1, $t_1$, R1, $t_2$ . . . R1, T, with T being an integer greater than or equal to 2, for each transmission are compared with each other. For example, only the commands that have obtained identical results at each execution are actually stored in memory as dynamic authentication data, which guarantees greater stability of the authentication method.

In E7, the script $SC1_1$ of the pair identified by $ID\text{-}CRP1_1$ is sent to the terminal equipment ET1.

Upon receipt in E8 of a response from the terminal equipment ET1 including a result R, said result is evaluated by comparison with the reference $R1_1$ stored in memory. A correspondence score is calculated in E9. For example, for a "canvas" type command, the result of the command is an image such as those of FIGS. 1A and 1B, the pixel intensities of which are compared with those of the reference image $R1_1$.

A decision is made at E10 based on the calculated match score. If it is greater than a predetermined threshold, the authentication is considered successful, otherwise as failed. For example, for a "canvas" type command, authentication is considered successful if the images are identical.

In a variation, the server equipment S successively commands several rendering operations on the terminal equipment ET1. In other words the steps E7, E8, E9 and E 10 are repeated for distinct commands. This increases the security of authentication by making it more difficult for the malicious user to replicate the results. It will be noted that the commands are issued successively, following a successful authentication decision of the previous command, so as not to waste unnecessarily pairs of dynamic authentication data.

Following this dynamic authentication step, whether successful or unsuccessful, a step E11 or E12 of updating a pair of dynamic authentication data ID-CRP1$_1$ of the terminal equipment stored in memory is implemented.

If the authentication is successful, the updating step E11 comprises the following substeps:

In E11$_{1'}$ new rendering control pair CRP1$_2$ is obtained. Two embodiments are envisaged.

In the first embodiment of the invention according to which several pairs of authentication data CRP1$_2$-R1$_2$, CRP1$_3$-R1$_3$ ... CRP1$_N$-R1$_N$ have been stored in the reserve table TED', the step E11$_1$ consists in recovering a command-result pair in reserve, for example the pair CRP1$_2$-R1$_2$.

According to a second embodiment of the invention, the server equipment S does not have a command-rendering pair in reserve for the client equipment ET1. In the step it selects a new script SC1$_2$, it transmits it to the terminal equipment identified ET1 and receives the result R1$_2$.

Note that, to feed the reserve table of the first embodiment, it is necessary to regularly benefit from successful authentication with the user and terminal equipment ET1 to transmit a set of new commands thereto. Moreover, a status check of the stock can advantageously be implemented so as to trigger e.g. step E11$_1$' when the number of pairs in reserve is less than a predetermined threshold, for example equal to 3.

In E11$_2$, the pair of authentication data ID-CRP1$_1$ that has just been used is replaced by the new pair ID-CRP2$_1$. As a result, the data pair ID-CRP1$_1$ will not be reused for a next authentication of the client equipment.

If the authentication is unsuccessful, the connection request is rejected and for added security, the user's account can be blocked. For example, the table TU is updated by changing the state ST of the user's account and forcing it to the "blocked" value.

According to the invention, the step of updating the authentication data of the terminal equipment ET1 then consists of a step E12 for deleting the data pair ID-CRP1$_1$ from the memory M1. In this way, it may not be used any longer for future authentication of the terminal equipment ET1.

It is understood that after this operation, the terminal equipment ET1 associated with the identifier of the user no longer includes valid authentication data.

Advantageously, the method further comprises the following steps:

a step E13 of additional authentication or verification of the identity of the user comprising the transmission of an additional authentication request message to the identified terminal equipment ET1, comprising an authentication parameter, such as for example a code comprising a sequence of alphanumeric characters. Advantageously, the server equipment transmits to the terminal equipment ET1, for which the authentication has failed, a GET or POST type http request specifying a home page comprising a message that invites said user to enter the code in question to unblock his account.

If the code has been entered correctly, it means that the user is indeed who he claims to be and that he used a new terminal equipment ET2, which had not been registered yet by the server S. The method then triggers a registration step E14 of this new terminal equipment ET2. The registration phase unfolds as described above. An identifier of the new terminal equipment, for example of the static footprint ES2 type is registered in association with the ID of the user ID-UT and at least one pair of authentication data ID-CRP2$_1$ of the new terminal equipment ET2 is stored in memory. For example, a new line Ln2 is created in the table TA of FIG. 5E. It associates with the identifier of the user ID-UT, the static footprint ES2 and the dynamic control identifier ID-CRP2$_1$. At the end of this phase, the user's account is unblocked by switching the state field ST of the table TU to the "unblocked" value.

It should be noted, however, that this case remains unlikely, when the step of identifying the terminal equipment by a static footprint command is implemented. Indeed, the step of dynamic authentication of the terminal equipment being triggered only after successful identification, it implies that said new terminal equipment has generated a static footprint which is very close to that of the first equipment ET1.

If the code is not correctly entered by the user, it means that a malicious user is requesting access to the service. The user account remains blocked. If the user subsequently tries to access the service from one of his terminal equipment, an additional authentication request step similar to the already described step E13 will be triggered to unblock his account. The unblocking process will advantageously comprise a change in the user authentication data, for example the password and, for a terminal equipment identified ET1 by its static footprint ES1, the replacement of the dynamic authentication data ID-CRP1$_1$ previously deleted. If data pairs are available in reserve in the table TED', one of them can advantageously be used.

According to another embodiment of the invention, the pair of pattern rendering commands and associated results stored in TED and TED' memory are associated with a field representative of a state of use STED. This field is for example a Boolean that can take the value 1 representative of the "usable" state and the representative value of 0 of the "used" state. Advantageously, as soon as the server equipment sends a request comprising the script associated with the command of an ID-CRP1$_1$ pair, it changes the value of the state and switches it to the "used" state. This makes it possible to avoid the case of a hacker who voluntarily stops the authentication by blocking the sending to the server equipment of the result of the command by his terminal equipment. Indeed, in this case, authentication does not succeed. No decision of failure or of success is taken, so that the update of the authentication data according to the invention is not triggered. Nevertheless, according to this embodiment, during a subsequent authentication request, the server equipment verifies the STED state of a pair of authentication data before transmitting the parameterised rendering command to the terminal equipment and will only trigger sending if the state is in the "usable" mode. If this is not the case, he will look for a reserve pair in the table TED'. It is understood that this additional field makes it possible to prevent a malicious user from forcing the reuse of a command already used by the authentication method. The value of the state field STED1$_2$ is advantageously initialised during the registration of a pair of data ID-CRP1$_2$ in the reserve table, to a state at the "usable" value. Once the pair ID- $CRP1_2$ taken to serve as authentication data in the table TED, the field STED of the reserve pair is set to the "used" value.

In relation with FIG. 6, the exchanges of information between the terminal equipment ET1 of the user UT and the server equipment S and the operations carried out on both sides are now described.

When first connecting to the service Sv, the user UT is prompted by the server A1 to register by selecting an identifier ID-UT and a password MDP that it sends to the server in D1. Other information such as his email address ©1 may be requested from said server. Upon reception of this information, the server stores it in memory, for example in the table TU. During or following this exchange, the server equipment S sends to the terminal equipment ET1 in A2 a static footprint command CES that the client equipment executes in D2. It sends the result ES1 to the server S which stores it, accompanied by an identifier of the terminal equipment ID-ES1, for example in the table TES.

During or following this exchange, the server equipment S sends in A3 to the terminal equipment ET1 one or more configurable rendering commands $SC1_1$, $SC1_2$, ... $SC1_N$, with N being a non-zero integer.

Unlike the CES static footprint command, which is fixed and generally common to all the pieces of terminal equipment, the parameterisable rendering command can be chosen so as to be specific to a single terminal. To do this, such a command comprises a large number P of parameters, typically greater than or equal to 40. A parameter that can generally take a number of values greater than or equal to 100, this ensures that the same command is not generated twice. In addition, the parameters of such a command are advantageously generated randomly. This makes it almost impossible to predict a command to come and secondly to avoid the repetition over time of the sending of the same command.

In a particular embodiment, the rendering command is of "canvas" type whose script comprises including an instruction of fillStyle(p) type. p is a parameter controlling the filling colour of an element such as an ellipse to be reproduced by the terminal equipment in a drawing surface. The filling colour p is of 'rgb' type and can take more than 16 million different values.

In response, the terminal equipment ET1 generates in D3 the commanded results and returns the results $R1_1$, $R1_2$, ... $R1_N$ produced to the server equipment S.

Upon reception, the server S stores the command-result pairs obtained in memory. Advantageously, it selects a pair $ID-CRP1_1$ to form the authentication data of the terminal equipment ET1 that it stores advantageously in the table TED. The other pairs are stored in a table TED' stored for example in a second memory M2.

These two last exchanges of static and dynamic footprint commands are executed very quickly and completely transparent to the user UT. As previously described, their scripts are advantageously inserted into an HTML page. The total processing time is about 1s per command.

During a second connection to the service Sv requested by the user UT from the same terminal equipment ET1, the user is prompted by the server in a first authentication phase E0, E1, E2 of the user to enter his identifier and his password, which he does in T1. The credentials entered are processed by the server that compares them to those it has stored in memory.

In the event of successful authentication, the server sends to the terminal equipment ET1 the static footprint command CES in E3. The terminal equipment responds in T2 by producing the static footprint ES from the requested hardware and software requirements. The server receives it at E4, compares it at E5 to the footprint(s) stored in memory for this user UT. If he finds a match with one of them, it considers in E6 having identified the terminal equipment ET1.

Starting from the static footprint ES1 which identifies the terminal ET1, the server retrieves the parameterisable rendering command $SC1_1$ which is part of its dynamic authentication data and sends it to E7 at the terminal ET1. The terminal responds by executing the command at T3 and returning the rendering of the generated pattern $R1_1$.

Upon reception, the server S compares in E9 the result received in E8 to the reference it has stored in memory. In case of sufficient match, it decides in E10 that the authentication is successful. According to the invention, it immediately updates the authentication data $ID-CRP1_1$, by replacing them with another pair. Advantageously, it will search in $E11_1$ a pair $ID-CRP1_2$ previously set aside in the table TED', or it generates in $E11_1'$ a new command $SC1_2$ and transmits it in $E11_2$ to the terminal ET1. The terminal returns the pattern rendering $R1_2$ in T4. Upon receipt of the result $R1_2$, it stores the new pair of authentication data $ID-CRP1_2$ in memory instead of the old pair $ID-CRP1_1$. It then issues a service access authorisation for the user UT from its terminal ET1 and transmits it to its module TS which executes the remote service.

FIG. 7 shows the simplified structure of an authentication device 100 adapted to implement the authentication method according to any of the particular embodiments of the invention which have just been described. The device 100 is in particular configured to:

authenticate the user from credentials, such as an identifier and a password;

in the event of successful authentication of the user, authenticating the terminal equipment from credentials stored in a first memory of the server equipment, for example the memory M1 in association with the identification information of the user, comprising a rendering execution command of a first pattern, said command comprising description parameters of the first pattern, and a rendering of the first pattern received from the client, so-called reference pattern, comprising:

sending to the client equipment the first pattern rendering execution command;

upon receipt of a response including a rendering of the first pattern by the client equipment, comparing it with the reference rendering and evaluating a match score;

deciding on successful authentication when the match score is greater than a predetermined threshold;

According to the invention, the device is configured to update the credentials of the terminal equipment, following the authentication.

The device 100 is further configured to implement the various embodiments of the invention which have just been described in relation to FIGS. 3 and 6.

According to a particular embodiment of the invention, the steps of the authentication method are implemented by computer program instructions. To do so, the device 100 has the conventional architecture of a computer and in particular comprises a memory MEM, a processing unit UT1, equipped for example with a microprocessor p1, and driven by the computer program Pg1 stored in the memory MEM1. The computer program Pg1 includes instructions for implementing the steps of the authentication method as described above, when the program is executed by the processor p1.

At initialisation, the code instructions of the computer program Pg1 are for example loaded into a RAM before being executed by the microprocessor p1 of the processing unit UT1.

According to another particular embodiment of the invention, the authentication method is implemented by functional modules or units. For this purpose, the device 100 furthermore comprises the following modules:

authentication of the user's AUTH UT from credentials, such as an identifier and a password;

in the event of successful authentication of the user, authenticating AUT ET of the terminal equipment from credentials stored in a first memory of the server equipment, for example the memory M1 in association with the identification information of the user, comprising a rendering execution command of a first pattern, said command comprising description parameters of the first pattern, and a rendering of the first pattern received from the client, so-called reference pattern, said authentication comprising:

sending REQ $SC1_1$ to the client equipment the first pattern rendering execution command;

upon receipt of a response including a rendering R of the first pattern by the client equipment, comparing with the reference rendering R11 and evaluating EVAL a match score;

deciding DEC on successful authentication when the match score is greater than a predetermined threshold;

According to the invention, the device comprises a unit for updating MAJ the credentials of the terminal equipment, adapted to be implemented following the authentication. Advantageously, such a device 100 stores in the first memory M1 the authentication data of the user and the terminal equipment implemented by the invention. In a particular embodiment it comprises the tables TU, TES, TED, TED' and TA presented in relation to FIGS. 5A to 5E. Optionally, the reserve table TED' can be stored in a second memory M2.

The device 100 can be integrated with a server equipment S capable of hosting the service Sv. The device 100 is then arranged to cooperate at least with the next modules of the server S:

a data transmission/reception module E/R, enabling the exchange of authentication data with the client equipment via the telecommunications network RT;

a processing module TS, able to execute the service Sv, as illustrated in FIG. 2.

The various functional modules described above can be in hardware and/or software form. Under a software form, such a functional module may include a processor, a memory and program code instructions for implementing the function corresponding to the module when the code instructions are executed by a processor. In a material form, such a functional module can be implemented by any type of suitable coding circuits, such as for example and without limitation microprocessors, Digital Signal Processors (DSPs), Application Specific Integrated Circuits (ASICs), Field Programmable Gate Arrays (FPGAs), a logic unit wiring.

It will be noted that the invention which has just been described can be implemented by means of software and/or hardware components. In this context, the terms "module" and "entity", used in this document, can correspond either to a software component, or to a hardware component, or to a set of hardware and/or software components, capable of implementing the function(s) described for the module or entity concerned.

An exemplary embodiment of the present invention improves the situation of the prior art.

An exemplary embodiment of the invention particularly aims to overcome these disadvantages of the prior art.

More specifically, an exemplary embodiment of the invention proposes a solution that improves security without harming the user.

It goes without saying that the embodiments which have been described above have been given for purely indicative and non-limiting reasons, and that many modifications can easily be made by those skilled in the art without departing from the scope of the invention.

The invention claimed is:

1. A method for authenticating a user of a terminal equipment connected to a communication network, for access from this terminal equipment to a remote service hosted by a server equipment connected to said network, said method comprising the following acts implemented by the server equipment:

authenticating the user from user's credentials;

in the event of successful user authentication, authenticating the terminal equipment from credentials stored in a first memory of the server equipment in association with the user's credentials, including an execution command to render a first pattern whose values are randomly selected from a plurality of predetermined values, said command comprising parameters describing the first pattern, whose values are selected randomly among a plurality of predetermined values, and rendering the first pattern received from the terminal equipment, called a reference rendering, said authentication comprising the following substeps:

sending to the terminal equipment the first pattern rendering execution command;

upon receipt of a response comprising a rendering of the first pattern by the terminal equipment, comparing with the reference rendering and evaluating a match score;

deciding on authenticating the terminal equipment according to the evaluated match score, a successful authentication being decided when the match score is greater than a predetermined threshold; and following the authentication decision, updating the credentials of the terminal equipment, said updating comprising, following a failed authentication, deleting the execution command of rendering of the first pattern and the rendering of the first pattern of the first memory and, in the event of successful authentication of the terminal equipment, replacing the first pattern rendering execution command and the reference rendering stored in the first memory, with an execution command of rendering of a second pattern, distinct from the first pattern and a rendering of the second pattern.

2. The authentication method according to claim 1, wherein the updating step comprises, in case of successful authentication, a sub-act of obtaining the rendering of the second pattern by the terminal equipment by reading a second memory of the server equipment.

3. The authentication method according to claim 1, wherein the updating comprises following the successful authentication, a sub-act of obtaining the rendering of the second pattern by the terminal equipment by transmission of the second pattern rendering execution command, and receiving a response comprising a rendering of the second pattern by the terminal equipment.

4. The authentication method according to claim 1, wherein at least one of the first pattern rendering execution command or the second pattern execution command is a command belonging to a group consisting of:
- a "canvas" type command for producing a graphic pattern in a rectangular frame of a predetermined size;
- an audio context type command comprising parameters for describing an audio signal and for generating an audio rendering;
- A "getClientRects" type command, for generating a plurality of rectangles corresponding to the text line boundaries of an HTML element.

5. The authentication method according to claim 1, wherein, following a failed authentication, the method comprises:
- verifying an identity of the user comprising issuing an authentication request to the terminal equipment, and, in case of a positive result, creating new authentication data associated with a second terminal equipment, comprising transmitting a third pattern rendering execution command by the second terminal equipment and upon receipt of the rendering storing authentication data, associating with an identifier of the second terminal equipment said third pattern rendering execution command and said rendering of the third pattern.

6. A device for authenticating a user of a terminal equipment for access from a client browser of the terminal equipment to a remote service hosted by a server equipment, said device comprising:
- a calculation machine dedicated or configured to:
- authenticate the user from user's credentials;
- in the event of a successful user authentication, authenticating the terminal equipment from credentials stored in a first memory of the server equipment in association with the user's credentials, comprising an execution command to render a first pattern whose values are randomly selected from a plurality of predetermined values, said execution command comprising parameters describing the first pattern, and rendering the first pattern received from the terminal equipment, called a reference rendering, said authentication comprising:
- sending to the terminal equipment the first pattern rendering execution command;
- upon receipt of a response including a rendering of the first pattern by the terminal equipment, comparing with the reference rendering and evaluating a match score;
- deciding on successful authentication when the match score is greater than a predetermined threshold;
- following the authentication decision-, the calculation machine is configured to update the credentials of the client browser of the terminal equipment, delete, following an unsuccessful authentication, the first pattern rendering execution command and the rendering of first pattern of the first memory and, upon successful authentication of the terminal equipment, to replace the first pattern rendering execution command and the reference rendering stored in the first memory, with a execution command of rendering of a second pattern, distinct from the first, and a rendering of the second pattern.

7. The device according to claim 6, wherein the device is implemented in the server, and the server comprises transmission/reception module connected to a telecommunications network, a processing module configured to execute the remote service.

8. A non-transitory computer-readable medium comprising instructions stored thereon, which when executed by a processor of server equipment, configure the server equipment to perform a method of authenticating a user of terminal equipment connected to a communication network, for access from this terminal equipment to a remote service hosted by the server equipment connected to said network, said method comprising the following acts implemented by the server equipment:
- authenticating the user from user's credentials;
- in the event of successful user authentication, authenticating the terminal equipment from credentials stored in a first memory of the server equipment in association with the user's credentials, including an execution command to render a first pattern whose values are randomly selected from a plurality of predetermined values, said command comprising parameters describing the first pattern, whose values are selected randomly among a plurality of predetermined values, and rendering the first pattern received from the terminal equipment, called a rendering reference pattern, said authentication comprising the following substeps:
  - sending to the terminal equipment the first pattern rendering execution command;
  - upon receipt of a response comprising a rendering of the first pattern by the terminal equipment, comparing with the rendering reference pattern and evaluating a match score;
- deciding on authenticating the terminal equipment according to the evaluated match score, a successful authentication being decided when the match score is greater than a predetermined threshold; and
- following the authentication decision, updating the credentials of the terminal equipment, said updating comprising, following a failed authentication, deleting the execution command of rendering of the first pattern and the rendering of the first pattern of the first memory and, in the event of successful authentication of the terminal equipment, replacing the first pattern rendering execution command and the reference rendering stored in the first memory, with an execution command of rendering of a second pattern, distinct from the first pattern, and a rendering a second pattern.

* * * * *